Nov. 29, 1960  L. A. DE ROSA  2,962,708
RADAR-BEACON ALARM SYSTEM
Filed Jan. 3, 1957  2 Sheets-Sheet 1

INVENTOR.
LOUIS A. DeROSA
BY
Wade Koontz
Walter J. Kreske
ATTORNEYS

Nov. 29, 1960   L. A. DE ROSA   2,962,708
RADAR-BEACON ALARM SYSTEM
Filed Jan. 3, 1957   2 Sheets-Sheet 2

INVENTOR.
LOUIS A. DeROSA
BY
ATTORNEYS

United States Patent Office 2,962,708
Patented Nov. 29, 1960

2,962,708

RADAR-BEACON ALARM SYSTEM

Louis A. De Rosa, Upper Montclair, N.J., assignor to the United States of America as represented by the Secretary of the Air Force Filed Jan. 3, 1957, Ser. No. 632,405

2 Claims. (Cl. 343—6.5)

This invention relates to radio navigation systems and more partially to radar-beacon alarm systems for indicating aircraft flying dangerously close to each other.

Because of increasing air traffic, particularly in and around airports, it becomes desirable to provide a signalling arrangement for indicating aircraft flying so close to each other that there is danger of a collision. For effectiveness such signalling arrangement must also identify the particular aircraft involved and provide this information in continuously and readily utilizable form to assist the operator in making the needed, rapid decisions for alleviating the condition. Pursuant to the present invention the above and other desirable features and advantages are achieved in an interrogator-responser alarm system.

Accordingly a primary object of the present invention is to provide a radar alarm system for indicating aircraft flying too close to each other.

Another object is the provision of a radar alarm system for providing an alarm signal when two aircraft fly at substantially the same relative positions at adjacent altitude levels.

A further object is the provision of a radar interrogation-responser arrangement which automatically identifies the particular aircraft which are dangerously close to each other.

These objects, features and advantages are achieved generally by providing a responder beacon in each aircraft for emitting a radio energy pulse at an assigned frequency characteristic of the altitude level, a radar with a scanning antenna and a receiver tuned to each of the assigned frequencies and an indicating arrangement responsive to the receivers for indicating the receivers receiving pulses from adjoining altitude levels in a preset time interval.

By providing an electronic switch for each of the receivers and in responsive relation to the preset time interval pulses of the associated receiver and a receiver tuned to an adjacent altitude level frequency in the indicating arrangement a relatively simple structure for triggering the indicator is achieved.

By providing a plan position indicator for each of the receivers, the aircraft at each altitude level are effectively displayed for rapid reference and identification of the specific aircraft in danger of collision.

These objects, features and advantages will become more apparent from the following description taken in connection with the accompanying drawings wherein.

Figure 1:
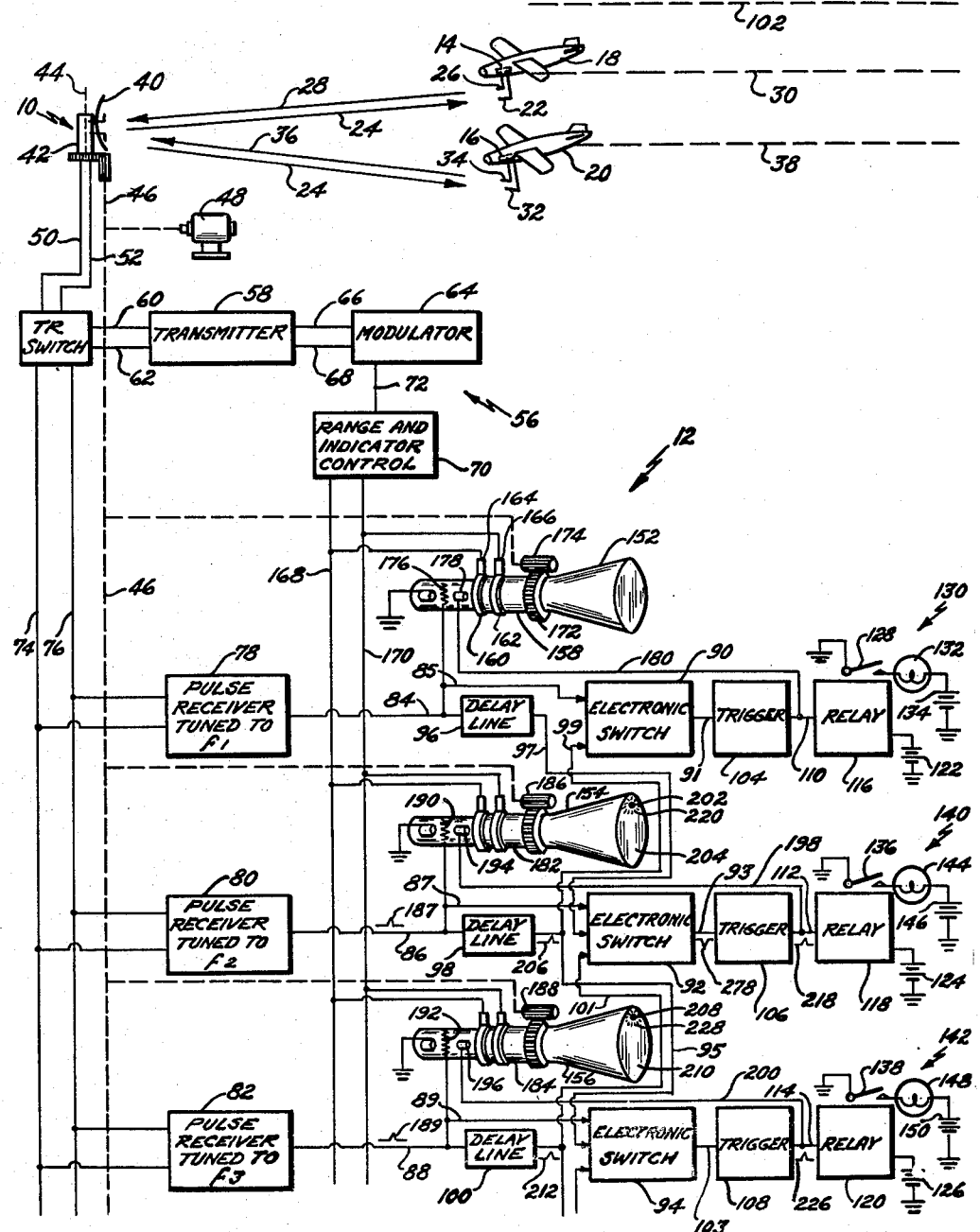
Fig. 1 is a partly block and partly schematic diagram of a navigation system made in accordance with the present invention.

Referring to Fig. 1 in more detail, a radar-beacon or navigation system made in accordance with the present invention is designated generally by the numeral 10. The system 10 comprises an interrogator-responser 12 used in cooperation with responder beacons as 14 and 16 mounted in aircraft 18 and 20 respectively. The responder beacons 14 and 16 each may be similar to that described on page 244 in the publication entitled Radar System Engineering by Louis N. Ridenour, published by McGraw-Hill Book Company, Inc. The responder beacon 14 may have a receiving antenna 22 for receiving radio pulse energy 24 at one frequency and a transmitting antenna 26 for emitting radio pulse energy 28 at a different frequency. The frequency of the pulse energy 28 is one which is assigned to a specific altitude level 30 at which the aircraft 18 is traveling. It is emitted from the antenna 26 in response to each received pulse energy 24 as described in the above Radar System Engineering publication.

Similarly the responder beacon 16 has a receiving antenna 32 for receiving radio pulse energy 24 and a transmitting antenna 34 for emitting radio pulse energy 36 at a different frequency from the pulse energy 28. The frequency of the pulse energy 36 is one which is assigned to the altitude level 38 at which the aircraft 20 is traveling.

While only two responder beacons 14 and 16 are shown operating at frequencies representing two altitude levels 30 and 38, many altitude levels with a different assigned beacon transmitting frequency identifying each altitude may also be used in the present system in manner to be hereinafter further described.

The interrogator-responser 12 has a conventional radar scanning antenna 40 mounted on a base 42 to rotate about an axis 44 by a geared linkage 46 energized by a motor 48. The antenna 40 is connected by suitable radio energy transmission lines 50 and 52 to a TR (transmit-receive) switch 54 in a conventional radar transmitting system 56. The radar transmitting system 56 includes a transmitter 58 connected by lines 60 and 62 to the TR switch 54 and a modulator 64 connected to the transmitter 58 by lines 66 and 68 and a sawtooth deflection voltage generator or range and indicator control 70 connected by a line 72 to the modulator 64.

The TR switch 54 is also connected through lines 74 and 76 to receivers 78, 80, and 82, each selectively tuned to receive radio frequencies $f_1$, $f_2$, and $f_3$ respectively. Each of the receivers 78, 80, and 82 is for monitoring an assigned altitude level by the radio frequency which it is tuned to receive. For example the frequency $f_2$ of the receiver 80 may be the same as that transmitted by the responder beacon 14 identifying the altitude level 30. Similarly the frequency $f_3$ of the receiver 82 may be the same as that assigned to the altitude level 38. While only three receivers 78, 80, and 82 have been shown in Fig. 1 for illustrative purposes, additional receivers may also be used with lines 74 and 76, each tuned to additional frequencies assigned to other selected altitude levels. Thus each successive receiver 78, 80, and 82 is assigned to monitor respective adjoining altitude levels.

Each of the receivers 78, 80, and 82 have output lines 84, 86, and 88 connected through lines 85, 87 and 89 to electronic switches 90, 92, and 94 respectively, a suitable circuit for which is described in more detail in connection with Fig. 3. The receiver output lines 84, 86, and 88 are also connected through delay lines 96, 98, and 100 respectively to the electronic switches representing the altitude levels immediately adjoining. For example, the delay line 98 representing the altitude level 30 is connected by line 95 to the electronic switch 94 representing the altitude level 38 and by line 99 to the electronic switch 90 representing an altitude level 102 immediately above the level 30. Similarly, the delay line 96 is connected by line 97 to the electronic switch 92 and the delay line 100 is connected by line 101 to the electronic switch 92.

The electronic switches 90, 92, and 94 are connected by lines 91, 93 and 103 to trigger circuits 104, 106, and 108 respectively. The trigger circuits 104, 106 and 108 are connected by lines 110, 112, and 114 to relay circuits 116, 118 and 120 respectively. Each of the relay circuits 116, 118 and 120 is also connected to the positive terminal of a power source as battery 122, 124 and 126 respectively.

The relay 116 is in operative relation to a movable switch arm 128 for closing an alarm circuit 130 which may include an electric light bulb 132 and an electric power source as a battery 134. Similarly the relays 118 and 120 are in operative relation to movable switch arms 136 and 138 in alarm circuits 140 and 142 respectively which may be the same as the alarm circuit 130. The alarm circuit 140 has an electric light bulb 144 in series with an electric power source as a battery 146. The alarm circuit 142 has an electric light bulb 148 in series with an electric power source as a battery 150.

Further alarm and beacon identifying apparatus is provided by including a plan position indicator 152, 154, and 156 for operation with each of the radio energy pulse receivers 78, 80 and 82 respectively. The plan position indicators 152, 154 and 156 may be cathode ray devices similar to those used in conventional radar systems. The plan position indicator 152 has a rotatable yoke 158 having a beam deflecting arrangement whose terminals are brought to slip rings 160 and 162 contacted by brushes 164 and 166 respectively connected through lines 168 and 170 respectively to the range and indicator control 70. The yoke 158 has a gear 172 driven by a pinion 174 connected through the mechanical linking 46 for synchronizing the rotation of the yoke 158 with the scan of the antenna 40.

The plan position indicator 152 also has a control grid 176 connected to the output line 84 of the pulse receiver 78. The plan position indicator 152 may also have an accelerating electrode 178 connected through a line 180 to the line 110 for purposes to be hereinafter described.

Similarly the plan position indicators 154 and 156 have yokes 182 and 184 which are rotated in synchronism with the antenna 40 by gears 186 and 188 respectively in the linkage 46.

The plan position indicators 154 and 156 also have control grids 190 and 192 connected to the output lines 86 and 88 respectively. The plan position indicators 154 and 156 have accelerating electrodes 194 and 196 similar to the accelerating electrode 178 connected by lines 198 and 200 to the lines 112 and 114 respectively.

In the operation of the radar-beacon or navigation system 10, a radio pulse energy 24 from the radar transmitting system 56 is transmitted through lines 50 and 52 and the antenna 40 to the responder beacons 14 and 16 in the aircraft 18 and 20 respectively. In response to the pulse energy 24, the responder beacons 14 and 16 emit radio pulse energy 28 and 36 at frequencies corresponding to the altitude level of the respective aircraft. For example, the aircraft 20, being at an altitude level 38, will have its responder beacon 16 emit radio pulse energy 36 at a frequency $f_3$ which is the frequency assigned to the altitude level 38. Similarly the responder beacon 14 in the aircraft 18 will emit radio pulse energy 28 at a frequency $f_2$ which is the assigned frequency for the altitude level 30. Other altitude levels such as 102 may have assigned thereto a different transmitting frequency as $f_1$.

The radio pulse energy 28 and 36 is picked up by the antenna 40 and carried through lines 50 and 52 through TR switch and line 74 and 76 to the pulse receivers 78, 80 and 82. Since the pulse receivers 80 and 82 are tuned to receive frequencies $f_2$ and $f_3$, the respective pulse energy signals 28 and 36 will be suitably detected and amplified by these receivers and will appear as pulses 187 and 189 in output lines 86 and 88 respectively.

The pulse 187 will appear at the control grid 190 of the plan position indicator 154 to effect a blip or spot 202 on the screen 204 corresponding to the position of the aircraft 18 with respect to the axis 44 of the antenna 40. This is due to the mechanical linkage 46 synchronizing rotation of the gear 186 with the scan of the antenna 40 and the range deflection information from the lines 168 and 170 in manner customary to radar plan position indicators.

Figure 2:
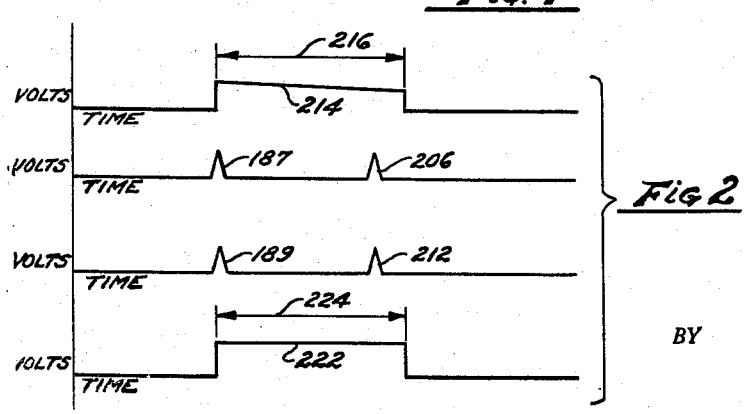
Fig. 2 is a voltage, time graph to more clearly illustrate operation of the apparatus shown in Fig. 1.

The pulse 187 in line 86 will also appear through line 87 at the electron switch 92 for purposes to be hereinafter described. The pulse 187 will also appear through the delay line 98 and lines 99 and 95 as a pulse 206 (Figs. 1 and 2) at each of the electronic switches 90 and 94.

In similar manner the pulse 189 in line 88 will appear at the control grid 192 of the plan position indicator 156 to likewise effect a blip or spot 208 on screen 210 representing the position of the aircraft 20 with respect to the scanning antenna axis 44. The pulse 189 will also appear through line 89 at the electronic switch 94. The pulse 189 will also appear throughout the delay line 100 as a delayed pulse 212 (Figs. 1 and 2) at the electronic switch 92. It will be noted that the electronic switch 92 has appearing thereat pulses 187 and 212 representing two adjacent altitude levels 30 and 38 respectively. The electronic switch 92, which is described in greater detail with respect to Fig. 3, is so designed that the pulse 187 creates a gate 214 (Fig. 2) having a duration 216 slightly longer than the delay between the pulses 187 and 212.

The pulse 212 appearing through line 101 at the switch 92 during the gate 214 will cause the trigger circuit 106 to effect a triggering pulse 218 in lines 112 and 198. The triggering pulse 218 will appear at the relay circuit 118 so as to cause it to move the switch arm 136 to thereby close the alarm circuit 140 and light the alarm bulb 144. The triggering pulse 218 will also appear through line 198 at the accelerating electrode 194 to cause a luminous spread 220 at the blip or spot 202 and thereby identify the location of the particular airplane 18 dangerously close to another adjacent altitude aircraft.

In similar manner the pulse 189 in line 88 will appear at the electronic switch 94 along with the delayed pulse 206 from the adjacent altitude circuit. The pulse 189 will create a gate 222 similar to the gate 214 and having a duration 224 slightly greater than that between the pulses 189 and 206. Thereby, the electronic switch 94 will cause the triggering circuit 108 to emit a triggering pulse 226 in line 114 so as to energize the relay 120 and close the switch arm 138. The alarm bulb 148 will thereby light. The pulse 226 will also appear through line 200 at the accelerating electrode 196 to cause the spot 208 on the screen 210 to have a luminescent spread 228 to thereby identify the particular aircraft 20 dangerously close to the adjoining altitude aircraft 18.

It will be noted that the two adjoining aircraft 18 and 20 both become positively identified on the plan position indicators 154 and 156 respectively by the luminous identifying spreads 220 and 228 respectively. Thus, an attendant or operator viewing these indicators is rapidly informed of aircraft moving in adjacent altitude levels and in proximate relation to each other.

By selectively setting the duration 216 of the gate 214, the proximity of distance between the planes 18 and 20 at which the alarm circuits 140 and 142 will be triggered to operate may be selectively adjusted. For example, if the duration 216 of the gate 214 is exactly that between the pulse 187 and the pulse 212, the alarm circuit 140 will be triggered to operate only when the airplanes 18 and 20 are directly one above the other. By increasing the duration 216 of the gate 214, the alarm circuit 140 will be triggered to operate even though the aircraft 18 and 20 may be at positions other than one directly above the other so long as they remain in adjacent altitude levels 30 and 38.

Figure 3:
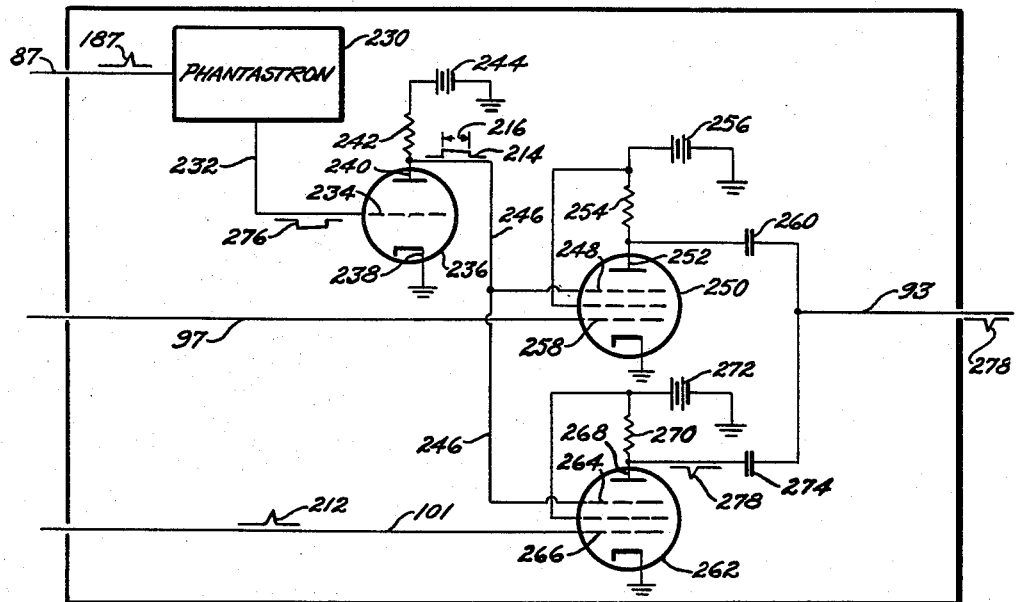
Fig. 3 is a partly block and partly schematic diagram of an electronic switch suitable for use in the embodiment shown in Fig. 1.

A suitable circuit for use as the electronic switch 92 is shown partially schematically and partially in block form in Fig. 3. Referring to Fig. 3 in more detail, the line 87 is connected to a multivibrator circuit preferably of the type known as a phantastron 230. Such a circuit is described in detail on pages 500 et seq. of a publication entitled Radar System Engineering written by Louis M. Ridenour and published by McGraw-Hill Book Co., Inc. The output of the phantastron 230 is connected through a line 232 to a control grid 234 of an electron tube 236 having a grounded cathode 238 and an anode 240 connected through a resistor 242 to the positive terminal of a power source such as a battery 244, the negative terminal of which is connected to the ground. The anode 240 is also connected by a line 246 to a grid 248 of a coincidence electron tube 250 having a grounded cathode. The coincidence tube 250 also has an anode 252 connected through a resistor 254 to the positive terminal of the power source as a battery 256, the negative terminal of which is connected to the ground. The anode 252 is also connected through a capacitor 260 to the output line 93. The coincidence tube 250 also has a control grid 258 connected to the line 97 from the delay line 96.

The electronic switch 92 also has a second coincidence electron tube 262 similar to the tube 250 and having a suppressor grid 264 connected to line 246 leading to the anode 240. The coincidence tube 262 also has a control grid 266 connected to the line 101 carrying pulse 212. The coincidence tube 262 also has an anode 268 connected through a resistor 270 to the positive terminal of a power source such as a battery 272, the negative terminal of which is connected to ground. The anode 268 is also connected through a capacitor 274 to the output line 93.

In the operation of the electronic switch 92 the pulse 187 in line 87 triggers the phantastron 230 to thereby cause a negative pulse 276 to appear through the output line 232 at the control grid 234 of the electronic tube 236. The negative pulse 276 has a duration selectively set in the phantastron 230 to be the same as the duration 216 (Figs. 2 and 3) of the corresponding gate 214 caused to appear thereby in the line 246 from the anode 240. The gate pulse 214 appears through the line 246 at the screen grid 248 and 264 of the coincidence tubes 250 and 262 respectively. During the gating pulse 214 the delayed pulse 212 appears through line 101 at the control grid 266 of the coincidence tube 262 thereby causing a negative pulse 278 to appear through the capacitor 274 in the line 93. It will be noted that in the present instance the coincidence tube 250 remained inoperative. However, in the event of an aircraft appearing at the altitude level 102 and at a position dangerously close to the aircraft 20, a pulse signifying that fact would appear in the line 97 and thereby in the line 93 in similar manner to that just described with respect to the coincidence tube 262.

The electronic switch 92 is the same in construction and operation as the electronic switches 90 and 94. In the case of the electronic switch 90, however, only one of the coincidence tubes 250 or 262 respectively is needed inasmuch as only one adjoining altitude signal 206 will appear at the electronic switch 90.

Figure 4:
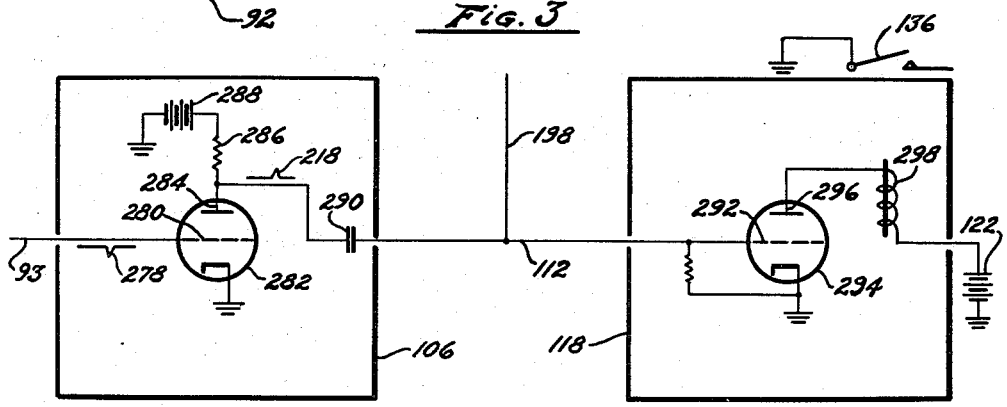
Fig. 4 is a schematic diagram of a trigger and relay circuits suitable for use in the embodiment shown in Fig. 1.

Suitable circuits for the trigger 106 and the relay 118 are shown schematically in Fig. 4. Referring to Fig. 4 in more detail, the line 93 is connected to a control grid 280 of a suitable electron pulse inverter and amplifier tube 282 having a grounded cathode and an anode 284 connected through a resistor 286 the positive terminal of a power source as a battery. 288, the negative terminal of which is connected to ground. The anode 284 is also connected through a capacitor 290 and the line 112 to a control grid 292 of an electron tube 294 in a relay circuit 118. The tube 294 also has an anode 296 connected to one end of a magnetic cored solenoid 298, the other end of which is connected to the positive terminal of the battery 124.

In the operation of the trigger circuit 106 and relay circuit 118, the negative pulse 278 appearing in line 93 at the control grid 280 causes a positive triggering pulse 218 to appear through the capacitor 290 and line 112 at the control grid 292 to thereby cause current to flow through the solenoid 298 to energize switch arm 136 so as to close the alarm circuit 140 as hereinabove described.

The triggering pulse 218 also appears through line 112 in the line 198 leading to the accelerating electrode 194 to cause the luminous spread 220.

The trigger circuits 104 and 108 and relay circuits 116 and 118 may be similar to the trigger circuit 106 and relay circuit 118 respectively, shown and described with respect to Fig. 4.

This invention is not limited to the particular details of construction and operation described as equivalents will suggest themselves to those skilled in the art.

What is claimed is:

1. In a radar-beacon alarm system for indicating aircraft flying dangerously close to each other in adjoining altitude levels, a beacon responder for each of said aircraft, each of said beacon responders including means for receiving interrogating radio energy pulses of one frequency and transmitting in response to each of said received pulses a radio energy pulse at a frequency selected for the altitude level of the associated aircraft, an interrogator-responser, said interrogator-responser including a scanning antenna for directionally emitting said interrogating pulses and receiving the corresponding beacon responder pulses, means for generating said interrogating pulses coupled to said antenna, a radio energy receiver for each of the altitude levels in said system coupled to said antenna, each of said receivers tuned to the frequency of the respective altitude level, an electronic switch for each of said receivers, each electronic switch being coupled to its associated receiver and a receiver tuned to the frequency selected for an adjacent altitude level, and beacon-identifying means responsive to each switch.

2. In a radar-beacon alarm system for indicating aircraft flying dangerously close to each other in adjoining altitude levels, a beacon responder for each of said aircraft, each of said beacon responders including means for receiving interrogating radio energy pulses of one frequency and transmitting in response to each of said received pulses a radio energy pulse at a frequency identifying the altitude level of the associated aircraft, an interrogator-responser, said interrogator-responser including a scanning antenna for directionally emitting said interrogating pulses and receiving the corresponding responder pulses, means for generating said interrogating pulses coupled to said antenna, a radio energy receiver for each of the altitude levels in said system coupled to said antenna, each of said receivers tuned to the frequency of the respective altitude level, an electronic switch for each of said receivers, a phantastron in each of said switches coupled to the associated receiver for creating a gate of selected duration, means in each of said switches responsive to the phantastron and the receivers tuned to frequencies of immediately adjoining altitude levels for passing a pulse from an adjoining altitude receiver during said gate, and means coupled to said switch responsive to said passed pulse for producing an alarm signal.

References Cited in the file of this patent

UNITED STATES PATENTS

| | | |
|---|---|---|
| 2,632,157 | Jones | Mar. 17, 1953 |
| 2,636,166 | Herbst | Apr. 21, 1953 |